United States Patent [19]
Karg et al.

[11] Patent Number: 5,705,859
[45] Date of Patent: Jan. 6, 1998

[54] NON-RAILBOUND VEHICLE WITH AN ELECTRIC MOTOR AND AN INTERNAL COMBUSTION ENGINE POWERED GENERATOR WHEREIN A LOW VOLTAGE SOURCE AND CAPACITORS ARE USED TO OPERATE THE GENERATOR AS A STARTER TO START THE ENGINE

[75] Inventors: Erich Karg, Detter; Dieter Lutz, Schweinfurt, both of Germany

[73] Assignee: Mannesmann Aktiengesellschaft, Düsseldorf, Germany

[21] Appl. No.: 522,282

[22] PCT Filed: Mar. 4, 1994

[86] PCT No.: PCT/DE94/00243

§ 371 Date: Sep. 13, 1995

§ 102(e) Date: Sep. 13, 1995

[87] PCT Pub. No.: WO94/22688

PCT Pub. Date: Oct. 13, 1994

[30] Foreign Application Priority Data

Apr. 2, 1993 [DE] Germany .................. 43 11 229.3

[51] Int. Cl.⁶ .................. B60L 11/02; B60L 11/12
[52] U.S. Cl. .................. 290/45; 180/65.4; 290/10
[58] Field of Search .................. 290/45, 10, 50; 180/65.2, 65.3, 65.4

[56] References Cited

U.S. PATENT DOCUMENTS 4,808,224  2/1989  Anderson et al. .................. 75/246
5,155,373  10/1992  Tsuchiya et al. .................. 290/38 R
5,164,623  11/1992  Shkondin .................. 310/67 R
5,402,046  3/1995  Jeanneret .................. 318/139

*Primary Examiner*—Steven L. Stephan
*Assistant Examiner*—Christopher Cuneo
*Attorney, Agent, or Firm*—Cohen, Pontani, Lieberman & Pavane

[57] ABSTRACT

A non-railbound vehicle in which at least one driving wheel is coupled with an electric motor which is supplied with electric current via power electronics influenced by an electronic control depending on the power requirement selected by the driver via an accelerator pedal. The current is produced by a generator (2) which is coupled with an internal combustion engine. The current for driving the generator is supplied with an operating voltage in the medium-voltage range. Additionally, there is a vehicle power supply in the low-voltage range which ensures the supply of power to accessory electrical consumers. The low-voltage power supply has a vehicle battery and is supplied with current obtained by transforming a portion of the mechanical energy generated by the internal combustion engine. The generator can also be operated as an electric motor for starting the internal combustion engine. A DC-voltage intermediate circuit outfitted with capacitors is connected downstream of the generator, and powers the electric motors. The electronic control is programmed to provide for a charging of the capacitors of the DC-voltage intermediate circuit from the vehicle battery before starting the internal combustion engine, and the current for motor operation (starter operation) of the generator is drawn from the DC-voltage intermediate circuit.

7 Claims, 1 Drawing Sheet

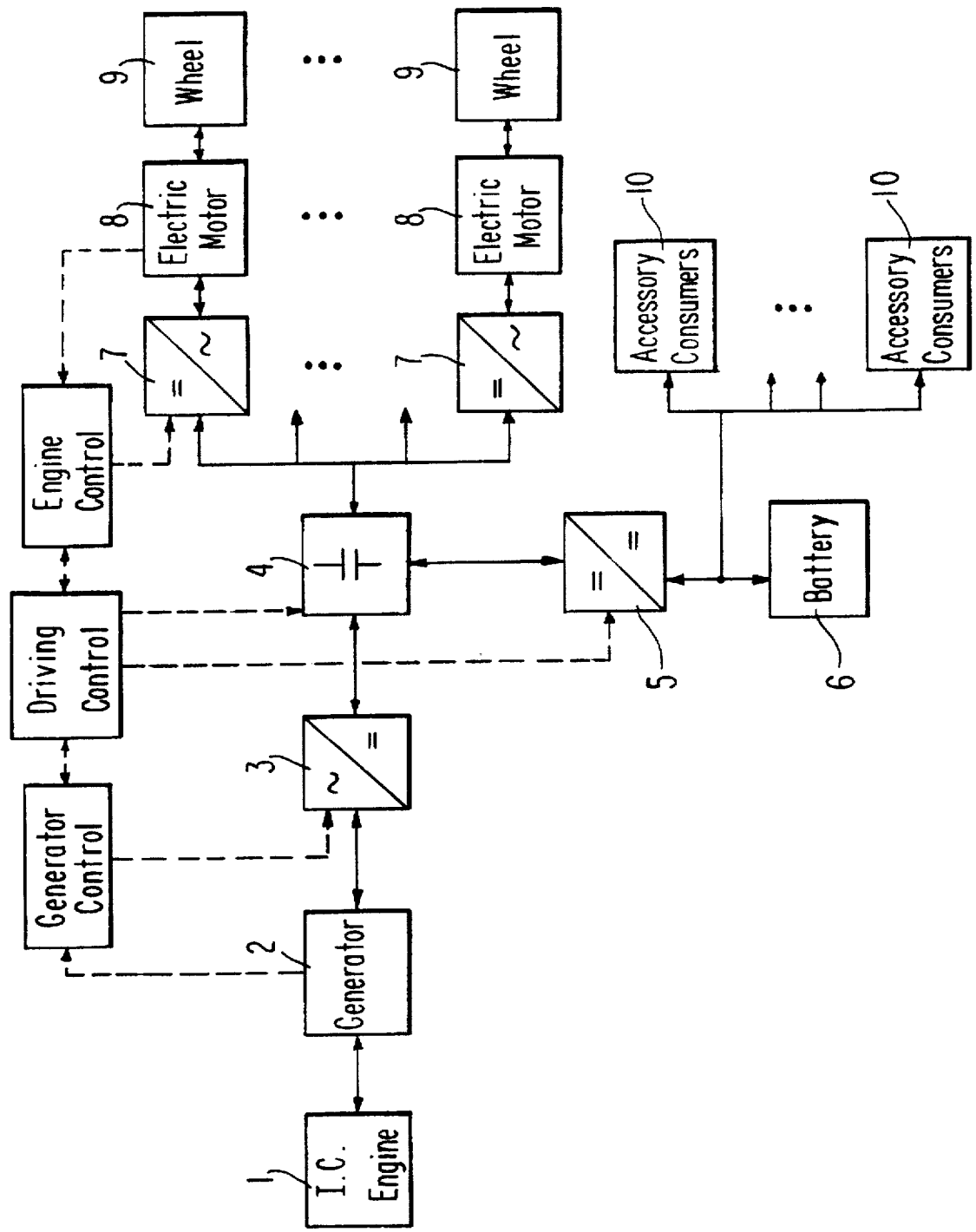

NON-RAILBOUND VEHICLE WITH AN ELECTRIC MOTOR AND AN INTERNAL COMBUSTION ENGINE POWERED GENERATOR WHEREIN A LOW VOLTAGE SOURCE AND CAPACITORS ARE USED TO OPERATE THE GENERATOR AS A STARTER TO START THE ENGINE

BACKGROUND OF THE INVENTION

1. Field of the Invention

The invention is directed to a non-railbound vehicle having at least one driving wheel coupled with an electric motor that is supplied with electric current via power electronics that are influenced by an electronic control based upon a power requirement selected by a driver of the vehicle via an accelerator pedal. The current produced by a generator is coupled with the internal combustion engine and a vehicle battery is provided for supplying power to accessories of the vehicle which consume electricity.

2. Discussion of the Prior Art

A drive system for non-railbound vehicles which are outfitted with an internal combustion engine whose output shaft is coupled with an electric generator is known from the publication "Vehicle transmissions—present and future [Getriebe in Fahrzeugen heute und morgan]" (VDI-Report [VDI-Berichte] 878, 1991, pages 611–622). The driving wheels of the vehicle are connected with electric driving motors which draw their driving power from the generator. Because of the comparatively high output required to drive the vehicle, the generator operates in the medium-voltage range (e.g., 650 volts). A low-voltage power supply (e.g., 12 or 24 volts) in the form of a suitable vehicle power supply with a vehicle battery is provided as is customary (also for safety reasons) for the secondary or accessory electrical consumers found in the vehicle such as interior and exterior illumination, ventilator motors, windshield defroster, passenger compartment heating system, electric window openers, etc.

In conventional vehicles, the power supply for accessory electrical consumers is generally provided by a small electric generator, also known as a dynamo, which is driven by the internal combustion engine. The dynamo also supplies the current required for charging the vehicle battery which is then available for supplying current to the accessory electrical consumers when the dynamo supplies insufficient current (low speed, many consumers turned on) or none at all (internal combustion engine not in operation). An electric motor (starter) supplied with power by the vehicle battery is used for starting the internal combustion engine and drives the internal combustion engine in low gear via a large speed reduction (e.g., 1:15).

It has already been mentioned in the publication VDI-Report 878 that the generator producing the current for the electric driving motors can take over the function of the dynamo and starter. However, no further details are given.

The starter of an internal combustion engine is a special electric motor rated for relatively low speeds and high torque. It must be capable of turning the crankshaft of the internal combustion engine over the top dead center in the individual cylinders. The starting of the internal combustion engine usually takes place at speeds in the range of 100–300 $min^{-1}$. The starter is only designed for short-term operation and, as concerns its current supply, is designed for connection to a standard vehicle battery, normally, 12 or 24 volts.

However, the generator which is coupled with the crankshaft in a vehicle of the generic type with an all-electric power transmission in the drive train has an entirely different design. It must be suitable for constant use and, as a rule, operates at appreciably higher speeds of the internal combustion engine (e.g., 750–5500 $min^{-1}$). Its voltage level is also appreciably higher than that of a starter motor, e.g., 90–650 volts, depending on the speed of the internal combustion engine, and thus lies in the medium-voltage range. In principle, the generator can be operated as an electric motor and can accordingly be used as a starter. However, the relatively high torque which must act on the crankshaft for the starting process must be taken into account. Due to its different design, the generator delivers such torque in motor operation only when it is supplied with a sufficiently high voltage. This does not pose a problem as long as there is an electric energy accumulator such as that which has already been suggested for storage of useful energy when braking the vehicle. Such an energy accumulator provides current with a high voltage corresponding to standard generator voltage (medium-voltage accumulator). However, problems occur when a medium-voltage accumulator of this type is not provided and only the vehicle battery of the low-voltage vehicle supply system supplying the accessory electric consumers can be used for starting. Namely, in this case, the applied voltage must overcome not only the EMF (electromotive force) of the generator at starting speed (e.g., 10 volts at 100 $min^{-1}$), but also the response voltage of the components of the power electronics (electric valves) associated with the generator. Under these conditions, the 12-volt battery is generally too weak. A 24-volt battery is also inadequate in many cases, particularly when the engine is cold.

EP-A-0 534 144 discloses a solution in which the starter for the internal combustion engine of a hybrid vehicle can be dispensed with, specifically in that the generator coupled with the internal combustion engine is used as a starter motor. Finally, it is known from EP-A-0 418 995 to operate the starter of an internal combustion engine with energy stored in high-capacitance low-voltage capacitors.

SUMMARY OF THE INVENTION

The object of the present invention is to improve a vehicle of the generic type as economically as possible in such a way that the internal combustion engine can also be started in the cold state using the generator as a starter motor when the standard vehicle battery (low voltage below 60 volts) is the only available energy source.

Pursuant to this object, and others which will become apparent hereafter, one aspect of the present invention resides in a non-railbound vehicle in which the generator is configured to operate as an electric motor for starting the internal combustion engine. A DC-voltage intermediate circuit, which includes capacitors, is connected downstream of the generator and supplies power to the electric motors for driving the wheels. The electronic control of the vehicle is configured and programmed to charge the capacitors of the DC-voltage intermediate circuit from the vehicle battery prior to starting of the internal combustion engine. The DC-voltage intermediate circuit is further operative to provide current for electric motor operation of the generator during starting of the vehicle.

In another embodiment of the present invention a voltage transformer is operatively connected between the electronic control and the vehicle battery for transforming the low voltage of the current drawn from the vehicle battery for starting the internal combustion engine into a medium voltage above 110 volts.

In still another embodiment of the invention the voltage transformer is configured to reduce the medium voltage to a low voltage for charging the vehicle battery.

Pursuant to yet another embodiment of the invention the generator is a multipolar permanently excited DC-generator with electronic commutation. The electronic control of the engine is operative to provide an oscillation starting of the engine when the amount of energy which is stored in the DC-voltage intermediate circuit and which can be supplied by the vehicle battery is insufficient for a direct rotation of the crankshaft of the internal combustion engine over a top dead center position.

In still yet another embodiment of the invention the generator is a multipolar permanently excited DC-generator with electronic commutation and permanent magnets made of an FeNdB alloy.

The invention provides that the electrical power which must be supplied to the generator for motor operation in order to start the internal combustion engine is drawn from an electrical intermediate storage which is, in turn, supplied with energy by the vehicle battery.

An intermediate storage in this sense is provided by a DC-voltage intermediate circuit which is outfitted with capacitors and connected downstream of the generator. The driving energy for driving operation is drawn from this DC-voltage intermediate circuit by the power electronics of the electric driving motors of the vehicle as determined by the electronic control. In normal driving operation, the voltage of this DC-voltage intermediate circuit is preferably in the medium-voltage range up to roughly 650 volts. In many cases it may also be advisable to exceed this value. In order to charge the capacitors, the electronic control effects a line connection from the vehicle battery to the DC-voltage intermediate circuit. The capacitors are capable of providing relatively high currents and accordingly high electrical outputs. Normally, a torque sufficient for a dependable start is already generated at roughly one third of the maximum current. Therefore, a 24-volt battery can be sufficient under these circumstances. It is more advantageous to outfit the vehicle with a voltage transformer (e.g., an electronic DC/DC converter) which brings the low voltage of the vehicle battery to a higher level and accordingly enables a greater charging of the capacitors. For extreme cases such as when starting at very low temperatures which lead to excessive mechanical resistance in the internal combustion engine (viscous motor oil, "seizing" of the engine), the invention further provides a possibility for enabling reliable starting also when the required torque is exceptionally high. This preferred construction consists. In this construction the crankshaft is at first not continuously rotated by the generator operating as motor, but rather is set in an oscillating movement. The electronic control then ensures that the oscillating crankshaft is successively supplied by the driving generator with an ever increasing amount of rotational energy at the appropriate point in time in order to get over the top dead center position of the internal combustion engine in building-up oscillations (oscillation starting). In this way, a starting torque can be achieved which is ultimately higher than that enabled by means of the generator by itself under the given conditions of the power supply. This oscillation starting can be carried out easily by the control because, also in the course of normal operation of the generator constructed as a multipolar permanently excited DC generator with electronic commutation, the control is continuously provided with highly precise information on the angular position of the rotor relative to the stator and the rotor is rigidly coupled with the crankshaft mechanically.

As a result of the invention it is not necessary to provide a separate battery with higher voltage only for starting the engine, which battery not only adds to the vehicle weight but also takes up considerable space. As in a conventional vehicle with a conventional starter motor, it is sufficient to use a standard vehicle battery as the electrical energy accumulator. A voltage transformer requiring minor expenditure also enables dependable starting under difficult conditions.

BRIEF DESCRIPTION OF THE DRAWINGS

In the following, the invention is explained more fully with reference to the embodiment shown as a block diagram in the individual FIGURE. The block diagram substantially shows the drive train of a non-railbound vehicle pursuant to the present invention.

DETAILED DESCRIPTION OF THE PREFERRED EMBODIMENTS

As can been seen in the drawing, an internal combustion engine 1 is coupled via its crankshaft with a generator 2 which is constructed as a multipolar permanently excited DC generator with electronic commutation. The generator 2 produces alternating voltage which is fed to a DC-voltage intermediate circuit 4 after rectification in a rectifier 3. The driving power for operating the electric motors 8, each of which is coupled with a wheel 9 of the vehicle, not shown, is drawn from the DC-voltage intermediate circuit 4. Like the generator 2, the electric motors 8 are preferably constructed as multipolar permanently excited DC generators with electronic commutation (block 7). The electric current is supplied to the electric motors 8 as pulsed direct current (block 7). The electronic control controlling the generator 2 and electric motors 8 is shown in blocks generator control, driving control, and engine control. An accelerator pedal 11 is actuated by the driver for selecting the power required for driving the vehicle. The overriding driving control is superposed on the engine controls, only one of which is shown by way of example, and the generator control. The signal flow is shown in dashed lines to distinguish it from the power flow shown in solid lines. The operating voltage in the DC-voltage intermediate circuit 4 lies in the medium-voltage range, preferably at approximately 650 volts. In addition to the electric motors 8, accessory electrical consumers 10 (e.g., ventilators, windshield defrosters, etc.) in the vehicle must also be supplied with current. For this purpose, a low-voltage vehicle power supply, e.g., 12 or 24 volts, containing a vehicle battery 6 is provided. In order to charge the battery 6 and/or to power the accessory consumers 10 in normal driving operation the required current is drawn from the DC-voltage intermediate circuit 4. Since the voltage level of the DC-voltage intermediate circuit 4 is essentially too high, the voltage is stepped down to the range of the vehicle power supply voltage in an electronic transformer 5. In order to start the internal combustion engine 1, the generator 2 which is coupled with the internal combustion engine 1 without an intermediate speed reduction is operated as a starter motor. For this purpose, the driving control causes the required electrical power to be drawn from the capacitors of the DC-voltage intermediate circuit 4, this electrical power allowing a current in the winding of the generator 2 which is high enough so that the generator 2 supplies a starting torque sufficient for rotating the internal combustion engine 1. The 12-volt vehicle battery 6 could not provide this current directly, since its voltage is too low. In the event that the capacitors of the DC-voltage intermediate circuit 4 do not already have a sufficient charge from a previous driving operation phase, the driving control first carries out a charging of the capacitors of the DC-voltage intermediate circuit 4. This can be effected with comparatively low power by means of the 12-volt battery 6. In order to achieve a greater charging of the capacitors and accordingly provide a higher output for the starting process, the voltage transformer 5 causes the battery current to be converted to a substantially higher voltage level (e.g., 200 or 300 volts) for this purpose; that is, it does not only carry out the aforementioned voltage reduction during normal generator operation for supplying current in the low-voltage vehicle power supply. Separate DC-DC converters could also be provided for these two tasks. As soon as the capacitors have been adequately charged, the electronic control initiates the actual starting process. The temporarily stored electrical energy can flow out of the capacitors at a comparatively high output and generates a sufficiently high starting torque for the internal combustion engine 1 in the generator 2.

In a particularly advisable manner, the generator 2 is an electric generator with electronic commutation outfitted with a plurality of permanent magnets of FeNdB alloy. Precisely at low temperatures, such permanent magnets have a particularly high magnetic flux. At a temperature of −25° C., for instance, this results in a torque which is approximately three times as great as that at room temperature. In so doing, an oscillation starting is generally unnecessary even under difficult conditions. Since a starting process takes only a few seconds, the power electronics are not damaged in spite of the very high currents which can take place under certain circumstances.

The invention is characterized in that it enables a reliable starting of the internal combustion engine at an extremely low additional cost with the use of units which are provided in any case for a vehicle of the generic type, and a conventional starter motor and conventional dynamo can be dispensed with without the need for replacement. In this way, a reduction in weight is achieved which ultimately also makes itself felt in a positive sense in a reduction in the specific fuel consumption.

We claim:

1. A non-rail bound vehicle, comprising:

an accelerator pedal;

an internal combustion engine;

at least one electric motor;

at least one driving wheel coupled with the at least one electric motor;

power electronics arranged and operative to supply electric current to the at least one electric motor;

electronic control means for influencing the power electronics depending on a power requirement selected by a driver of the vehicle via the accelerator pedal;

a generator operative to produce the electric current for the electric motor and coupled with the internal combustion engine, the generator being driveable by a current having an operating voltage in a medium-voltage range, the generator being configured to operate as an electric motor for starting the internal combustion engine;

accessory electrical consumers; and low-voltage vehicle power supply means for supplying power to the accessory electrical consumers, the low-voltage power supply means including a battery connected to the internal combustion engine so as to receive current obtained by transformation of mechanical energy of the internal combustion engine, the power electronics including DC-voltage intermediate circuit means that includes capacitors and is connected downstream of the generator for powering the at least one electric motor, the electronic control means including a driving control programmed and operative to connect the battery to the DC-voltage intermediate circuit means to charge the capacitors before the internal combustion engine is started, the DC-intermediate circuit means being operative to supply current to the generator for starting the engine.

2. A vehicle according to claim 1, wherein the generator is configured to be driveable by a current having an operating voltage in a range of 100 to 1500 volts.

3. A vehicle according to claim 1, wherein the low voltage power supply means provides power below 60 volts.

4. A vehicle according to claim 1, and further comprising a voltage transformer operatively provided to transform the low voltage of current drawn from the battery to the capacitors for starting the internal combustion engine into a medium voltage above 100 volts.

5. A vehicle according to claim 4, wherein the voltage transformer is also configured to reduce the medium voltage of the generator to a low voltage for charging the battery during operation of the internal combustion engine.

6. A vehicle according to claim 1, wherein the internal combustion engine includes a crankshaft, the generator being a multipolar permanently excited DC-generator with electronic commutation, the electronic control means being operative to provide oscillation starting of the internal combustion engine when an amount of energy which is stored in the capacitors of the DC-voltage intermediate circuit means and which can subsequently be provided by the battery is insufficient for direct rotation of the crankshaft of the internal combustion engine over a top dead center position.

7. A vehicle according to claim 1, wherein the generator is a multipolar permanently excited DC-generator with electronic commutation and permanent magnets of an FeNdB alloy.

* * * * *